United States Patent
Lhuillier et al.

(10) Patent No.: US 9,896,077 B2
(45) Date of Patent: Feb. 20, 2018

(54) MASTER BRAKE CYLINDER FOR A BRAKING SYSTEM OF A VEHICLE, AND MANUFACTURING METHOD FOR A MASTER BRAKE CYLINDER

(75) Inventors: Laurent Lhuillier, Le Blanc Mesnil (FR); Antony Auguste, Villiees/Marne (FR); Bastien Cagnac, Cramoisy (FR); Matthias Kistner, Bretzfeld (DE)

(73) Assignee: ROBERT BOSCH GMBH, Stuttgart (DE)

(*) Notice: Subject to any disclaimer, the term of this patent is extended or adjusted under 35 U.S.C. 154(b) by 878 days.

(21) Appl. No.: 14/348,842

(22) PCT Filed: Aug. 7, 2012

(86) PCT No.: PCT/EP2012/065424
§ 371 (c)(1),
(2), (4) Date: Feb. 12, 2015

(87) PCT Pub. No.: WO2013/045158
PCT Pub. Date: Apr. 4, 2013

(65) Prior Publication Data
US 2015/0321651 A1    Nov. 12, 2015

(30) Foreign Application Priority Data

Sep. 30, 2011 (DE) .................. 10 2011 083 873

(51) Int. Cl.
 *B60T 11/20* (2006.01)
 *B60T 11/16* (2006.01)
 *B60T 11/224* (2006.01)
(52) U.S. Cl.
 CPC ............. *B60T 11/16* (2013.01); *B60T 11/203* (2013.01); *B60T 11/224* (2013.01); *Y10T 29/49238* (2015.01)

(58) Field of Classification Search
 CPC ............................... B60T 11/203; B60T 11/20
 See application file for complete search history.

(56) References Cited

U.S. PATENT DOCUMENTS 2,087,509 A * 7/1937 Gardner ................ B60T 11/203
                                                  188/152
2,160,074 A * 5/1939 La Brie ................ B60T 11/203
                                                  188/152

(Continued)

FOREIGN PATENT DOCUMENTS

CN          1812905 A        8/2006
CN        101134460 A        3/2008

(Continued)

OTHER PUBLICATIONS

International Search Report for PCT/EP2012/065424, dated Mar. 6, 2013.

*Primary Examiner* — F. Daniel Lopez
(74) *Attorney, Agent, or Firm* — Norton Rose Fulbright US LLP (57) ABSTRACT

A master brake cylinder for a braking system of a vehicle is described, having a first pressure chamber. A first rod piston element is movable into at least a first partial pressure chamber of the first pressure chamber in such a way that a first partial residual volume of the first partial pressure chamber which is fillable with liquid is reducible by moving the first rod piston element. The master brake cylinder also includes a second partial pressure chamber of the first pressure chamber which is delimited from the first partial pressure chamber via at least one partial partition and into which a second rod piston element is movable in such a way that a second partial residual volume of the second partial pressure chamber which is fillable with liquid is reducible by (Continued)

moving the second rod piston element. Moreover, a manufacturing method is described for a master brake cylinder.

11 Claims, 4 Drawing Sheets (56) References Cited

U.S. PATENT DOCUMENTS

| | | | | | |
|---|---|---|---|---|---|
| 2,762,199 | A | * | 9/1956 | Major | B60T 11/203 |
| | | | | | 188/152 |
| 3,442,080 | A | * | 5/1969 | Rockwell | B60T 11/203 |
| | | | | | 188/152 |
| 4,505,116 | A | * | 3/1985 | Weiler | B60T 11/203 |
| | | | | | 60/547.1 |
| 2010/0164276 | A1 | | 7/2010 | Schluter et al. | |

FOREIGN PATENT DOCUMENTS

| | | |
|---|---|---|
| CN | 101239618 A | 8/2008 |
| CN | 102096129 A | 6/2011 |
| DE | 102006036311 | 2/2008 |
| DE | 102009055117 | 6/2011 |
| WO | WO2007/017100 | 2/2007 |

* cited by examiner

MASTER BRAKE CYLINDER FOR A BRAKING SYSTEM OF A VEHICLE, AND MANUFACTURING METHOD FOR A MASTER BRAKE CYLINDER

FIELD OF THE INVENTION

The present invention relates to a master brake cylinder for a braking system of a vehicle. Moreover, the present invention relates to a braking unit for a braking system of a vehicle and a braking system for a vehicle. Furthermore, the present invention relates to a manufacturing method for a master brake cylinder, a manufacturing method for a braking unit, and a manufacturing method for a braking system.

BACKGROUND INFORMATION

German Published Patent Appln. No. 10 2009 055 117 describes a master brake cylinder for a hydraulic vehicle braking system and a method for operating same. The master brake cylinder has a rod piston, which may be referred to as a first piston, and a tubular second piston. The first piston is movable by the second piston by a predefined piston travel into a first pressure chamber of the master brake cylinder. The purpose of an entrainer device provided on the second piston is to cause the first piston to carry along the second piston after overcoming the predefined piston travel. The aim is for the first piston and the second piston to be able to act together on the first pressure chamber of the master brake cylinder after overcoming the predefined piston travel. In addition, the aim is for a floating piston to be able to act on a second pressure chamber of the master brake cylinder.

SUMMARY

The present invention provides a master brake cylinder for a braking system of a vehicle, a braking unit for a braking system of a vehicle, a braking system for a vehicle, a manufacturing method for a master brake cylinder, a manufacturing method for a braking unit, and a manufacturing method for a braking system.

The first rod piston element and/or the second rod piston element may be a rod piston and/or a primary piston. However, it is pointed out that the first rod piston element and the second rod piston element are not limited to a design as a rod piston. In particular, the design of the first rod piston element and/or of the second rod piston element is not limited to a specific type of rod piston.

In addition, the first rod piston element and/or the second rod piston element may also be designed as contact parts for a rod piston in each case. In this case, the first rod piston element and/or the second rod piston element may also be referred to as the piston(s) which cooperate(s) with the particular rod piston and which delimit(s) the partial residual volume associated with it/them.

The first rod piston element and/or the second rod piston element may have a one-piece/one-part design. Likewise, the first rod piston element and/or the second rod piston element may also be composed of multiple combined sub-units. The use of the term "element" does not limit the design of the first rod piston element and/or of the second rod piston element to a one-piece design.

It is pointed out that the master brake cylinder of the present invention is not limited to a configuration with the first rod piston element and the second rod piston element. Instead, the master brake cylinder may be designed to cooperate with the at least two rod piston elements without these being regarded as part of the master brake cylinder.

SUMMARY

The present invention achieves a separation/subdivision of a rod piston element (primary piston), which is movable into a pressure chamber of the master brake cylinder, into various segments/pistons/bolt components. Stepped brake boosting is possible with the aid of the achieved separation. In particular, the braking surface in the master brake cylinder may be varied in this way.

In addition, the present invention achieves a separation/subdivision of the first pressure chamber of the master brake cylinder into at least two partial pressure chambers which may be delimited from one another. Stepped brake boosting is also achieved in this way. As explained in greater detail below, better compensation may be made for functional impairment of the brake boosting in particular by the stepped brake boosting.

The first pressure chamber is preferably understood to mean a pressure chamber device which includes at least the first partial pressure chamber and the second partial pressure chamber, in which a liquid exchange between the first partial pressure chamber and the second partial pressure chamber is ensured at least in one operating mode of the first pressure chamber. In other words, a hydraulic connection is present at least in one operating mode of the first pressure chamber, as the result of which the same internal pressure is present in the at least two partial pressure chambers of the first pressure chamber.

In one advantageous specific embodiment, the second partial pressure chamber is delimited from the first partial pressure chamber via a partition having at least one continuous flowthrough opening as a partial partition in such a way that the same internal pressure of the first partial pressure chamber and of the second partial pressure chamber is present in the first pressure chamber, which includes at least the first partial pressure chamber and the second partial pressure chamber. Setting the same internal pressure in the first partial pressure chamber and the second partial pressure chamber is easily achievable via the at least one continuous flowthrough opening.

As an alternative, the second partial pressure chamber may be delimited from the first partial pressure chamber via an opening-free partition as a partial partition, and the first partial pressure chamber may be hydraulically connected to the second partial pressure chamber via an externally guided line in such a way that the same internal pressure in the first partial pressure chamber and the second partial pressure chamber is present in the first pressure chamber, which includes at least the first partial pressure chamber and the second partial pressure chamber. In this case as well, the presence of the externally guided line in a state in which through flow is possible results in an automatic pressure compensation between the first partial pressure chamber and the second partial pressure chamber.

In another advantageous specific embodiment, the master brake cylinder includes a second pressure chamber into which a floating piston element protrudes in such a way that a residual volume of the second pressure chamber which is fillable with liquid is variable by moving the floating piston element. The present invention may therefore also be extended to a tandem master brake cylinder. The present invention may thus be used for numerous multicircuit braking systems having various designs.

In one easily implementable specific embodiment, the master brake cylinder includes the first rod piston element and the second rod piston element, the second rod piston element having a continuous recess into which at least a portion of the first rod piston element movably protrudes. As explained in greater detail below, such a design of the two rod piston elements results in a uniform pressure and force distribution when the two rod piston elements are moved into the first pressure chamber of the master brake cylinder.

Likewise, the second partial pressure chamber may have a design that is rotationally symmetrical with respect to the center longitudinal axis of the first partial pressure chamber. In this case as well, an advantageous pressure and force distribution is ensured when the two rod piston elements are moved into the first pressure chamber at the same time.

Furthermore, the master brake cylinder may include a third partial pressure chamber of the first pressure chamber which is delimited from the first partial pressure chamber and/or the second partial pressure chamber via at least one additional partial partition, and into which a third rod piston element is movable in such a way that a third partial residual volume of the third partial pressure chamber which is fillable with liquid is reducible by moving the third rod piston element. Three-stage and multistage brake boosting are thus achievable with the aid of the present invention.

The third partial pressure chamber may preferably have a design that is mirror-symmetrical with respect to the second partial pressure chamber regarding a plane of symmetry which centrally intersects the first partial pressure chamber. An advantageous pressure and force distribution is thus ensured, even when three rod piston elements are moved into the first pressure chamber at the same time despite the pressure which acts against the moving in.

The advantages described in the above paragraphs are also achieved in a corresponding braking unit for a braking system of a vehicle.

In one advantageous refinement, the braking unit includes a booster member of the brake booster on which a braking assisting force is exertable with the aid of an actuator device in such a way that the booster member is movable with the aid of the braking assisting force, the first rod piston element at least temporarily contacting a first contact surface of the booster member, or a first connecting component which contacts the first contact surface of the booster member, in such a way that the braking assisting force is at least partially transmittable to the first rod piston element, and the second rod piston element at least temporarily contacting a second contact surface of the booster member, or a second connecting component which contacts the second contact surface of the booster member, in such a way that the braking assisting force is at least partially transmittable to the second rod piston element. The two rod piston elements may thus be moved at the same time or independently of one another with the aid of an actuator device which actuates the brake booster.

In addition, the brake booster may include an input rod component on which a brake actuating element may be situated in such a way that a driver braking force exerted on the brake actuating element is transmittable to the input rod component, the input rod component being at least temporarily in direct or indirect contact with the first rod piston element in such a way that the driver braking force is at least partially transmittable to the first rod piston element, while an at least partial transmission of the driver braking force to the second rod piston element is prevented. The brake booster may thus act on both independent rod piston elements in such a way that the movement of the first rod piston element is assisted by the brake booster with the aid of the driver braking force, while the second rod piston element is moved at the same time solely by the brake booster without effort by the driver. This is ensurable due to the fact that both rod piston elements act on the same first pressure chamber of the master brake cylinder. In the event of a functional impairment of the brake booster, for example a failure of the brake booster, with the aid of the driver braking force the driver is still able to move the first rod piston element for increasing the pressure in the first pressure chamber, resulting in increased pressure build-up in the first pressure chamber compared to the exerted driver braking force, due to the changed hydraulic transmission. In other words, a higher rate of deceleration is achievable with the same effort due to the changed hydraulic transmission.

The above-mentioned advantages also result for the corresponding braking system for a vehicle.

Moreover, the advantages are also achievable by carrying out the manufacturing method for a master brake cylinder, the manufacturing method for a braking unit, and the manufacturing method for a braking system.

DETAILED DESCRIPTION

Figure 1:
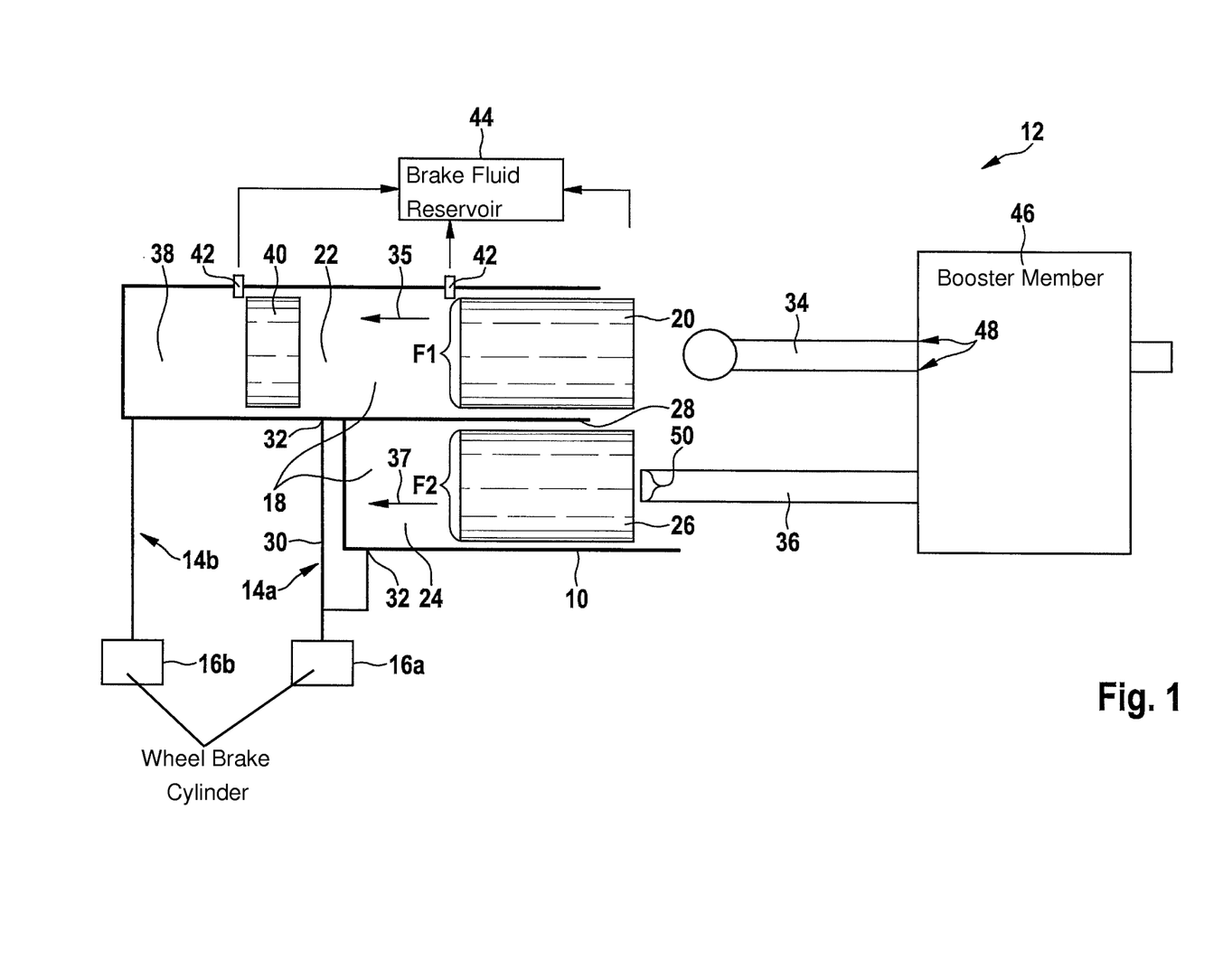
FIG. 1 shows a schematic illustration of a first specific embodiment of the master brake cylinder.

FIG. 1 shows a schematic illustration of a first specific embodiment of the master brake cylinder.

Master brake cylinder 10 schematically depicted in FIG. 1 may be used in a braking system of a vehicle. For example, master brake cylinder 10 may be a subunit of a braking unit composed of master brake cylinder 10 and a brake booster 12. The braking system which is equipped with master brake cylinder 10, or the braking system which is equipped with the braking unit, may have an arbitrary number of brake circuits 14a and 14b, each having at least one wheel brake cylinder 16a and 16b, respectively. The design of the braking system schematically depicted in FIG. 1 as a dual-circuit braking system is to be interpreted strictly as an example.

Master brake cylinder 10 has a first pressure chamber 18. A first rod piston element 20 may be moved into a first partial pressure chamber 22 of first pressure chamber 18 in such a way that a first partial residual volume of first partial pressure chamber 22 which is fillable with liquid is reducible by moving (in) first rod piston element 20. In addition, master brake cylinder 10 also includes a second partial pressure chamber 24 of first pressure chamber 18 into which a second rod piston element 26 may be moved in such a way that a second partial residual volume of second partial pressure chamber 24 which is fillable with liquid is reducible by moving (in) second rod piston element 26. First partial pressure chamber 22 and second partial pressure chamber 24 are delimited/separated from one another with the aid of at least one partial partition 28. It is pointed out that the delimitation of the two partial pressure chambers 22 and 24 from one another is not necessarily to be understood to mean sealing. Instead, the delimitation of the two partial pressure chambers 22 and 24 from one another may also be understood to mean solely a spatial/abstract separation/delimitation. The at least two partial pressure chambers 22 and 24 may also be situated in parallel to one another.

The two partial pressure chambers 22 and 24 are preferably hydraulically connected to one another, despite the at least one partial partition 28 formed in between, in such a way that a liquid exchange between the partial residual volume of the two partial pressure chambers 22 and 24 is ensured (at least in a certain operating mode of first pressure chamber 18). In other words, at least in the particular operating mode of first pressure chamber 18, the same internal pressure is present in both partial pressure chambers 22 and 24 due to the hydraulic connection between the two partial pressure chambers 22 and 24 or the liquid exchange which results. First pressure chamber 18 may thus still be referred to as a pressure chamber having a single internal pressure present therein, despite partial partition 28 which at least partially protrudes into same. Partial partition 28 may thus be understood to mean, for example, a partition having a flowthrough opening, and/or an interrupted partition.

Likewise, as schematically illustrated in FIG. 1, second partial pressure chamber 24 may be delimited from first partial pressure chamber 22 via an opening-free partition as a partial partition 28. To still ensure pressure compensation between the two partial pressure chambers 22 and 24, first partial pressure chamber 22 may be hydraulically connected/connectable to second partial pressure chamber 24 via an externally guided line 30 in such a way that the same internal pressure is present in first pressure chamber 18, which includes at least first partial pressure chamber 22 and second partial pressure chamber 24. Externally guided line 30 may also be a subunit of first brake circuit 14a which is associated with first pressure chamber 18. This is ensurable, for example, by hydraulically connecting first brake circuit 14a to each of the two partial pressure chambers 22 and 24 via a borehole 32 in each case.

First rod piston element 20 and/or second rod piston element 26 may be designed as rod pistons, for example. First rod piston element 20 and/or second rod piston element 26 may also be described as a primary piston or input piston. However, it is pointed out that the design of first rod piston element 20 and of second rod piston element 26 is not limited to rod pistons/primary pistons. For example, first rod piston element 20 and/or second rod piston element 26 may also be designed as master brake cylinder pistons which cooperate with a piston rod 34 or 36, respectively. In the design schematically depicted in FIG. 1, first rod piston element 20 is movable into first partial pressure chamber 22 with the aid of a first piston rod 34, braking taking place in first partial pressure chamber 22 at a delimiting surface F1 of first rod piston element 20. In other words, first delimiting surface F1 of rod piston element 20 delimits the first partial residual volume of first partial pressure chamber 22. Similarly, a second delimiting surface F2 of the second rod piston element which delimits the second partial residual volume of second partial pressure chamber 24 is displaceable between a second piston rod 36 and second rod piston element 26 with the aid of a force transmission contact.

First rod piston element 20 and/or second rod piston element 26 may have a one-piece/one-part design. Likewise, first rod piston element 20 and/or second rod piston element 26 may also be composed of multiple combined subunits.

First rod piston element 20 is preferably movable along a first displacement direction 35 which is parallel to a second displacement direction 37 of second rod piston element 26. In particular, first displacement direction 35 may have the same orientation as second displacement direction 37. First rod piston element 20 is preferably movable without second rod piston element 26 moving at the same time. The advantageous movability of first rod piston element 20 may be independent of a position of second rod piston element 26. Similarly, second rod piston element 26 may also be movable without first rod piston element 20 moving at the same time, and/or independently of a position of first rod piston element 20.

Master brake cylinder 10 thus achieves a separation/subdivision of a rod piston element (primary piston), which is movable into first pressure chamber 18 of master brake cylinder 10, into two different and independently movable rod piston elements 20 and 26, or a separation/subdivision of associated first pressure chamber 18. The (instantaneous) braking surface in first pressure chamber 18 of master brake cylinder 10 may be varied with the aid of the achieved separation. In particular, stepped brake boosting is thus possible.

In one refinement, master brake cylinder 10 may additionally include a second pressure chamber 38 into which a floating piston element 40, such as a floating piston, protrudes in such a way that a residual volume of second pressure chamber 38 which is Tillable with liquid is variable by moving floating piston element 40. (It is pointed out that first rod piston element 20 and second rod piston element 26 are not understood to mean floating pistons.) In addition, a balancing bore 42 may be provided in each case on master brake cylinder 10 for each pressure chamber 18 and 38, via which the particular pressure chamber 18 and 38 is connected to a brake fluid reservoir 44.

Brake booster 12, which cooperates with master brake cylinder 10, may include a booster member 46 on which a braking assisting force is exertable with the aid of an actuator device (not illustrated) in such a way that booster member 46 is movable with the aid of the braking assisting force. First rod piston element 20 may at least temporarily contact a first contact surface 48 of booster member 46, or a first connecting component which contacts first contact surface 48 of booster member 46, such as first piston rod 34, in such a way that the braking assisting force is at least partially transmittable to first rod piston element 20. In addition, second rod piston element 26 may at least temporarily contact a second contact surface 50 of booster member 46 in such a way that the braking assisting force is at least partially transmittable to second rod piston element 26. This is easily ensurable by designing second piston rod 36 as a subunit of booster member 46. Likewise, second rod piston element 26 may at least temporarily contact a second contact surface 50, or a second connecting component (not illustrated) which contacts second contact surface 50 of booster member 46, in such a way that the braking assisting force is at least partially transmittable to second rod piston element 26.

The components of brake booster 12 described in the above paragraph are only schematically depicted in FIG. 1. Reference is therefore made to the subsequent figures with regard to the possible design of brake booster 12 and the usability of above-described master brake cylinder 10, in particular for compensating for a functional impairment of brake booster 12.

Figures 2A, 2B:
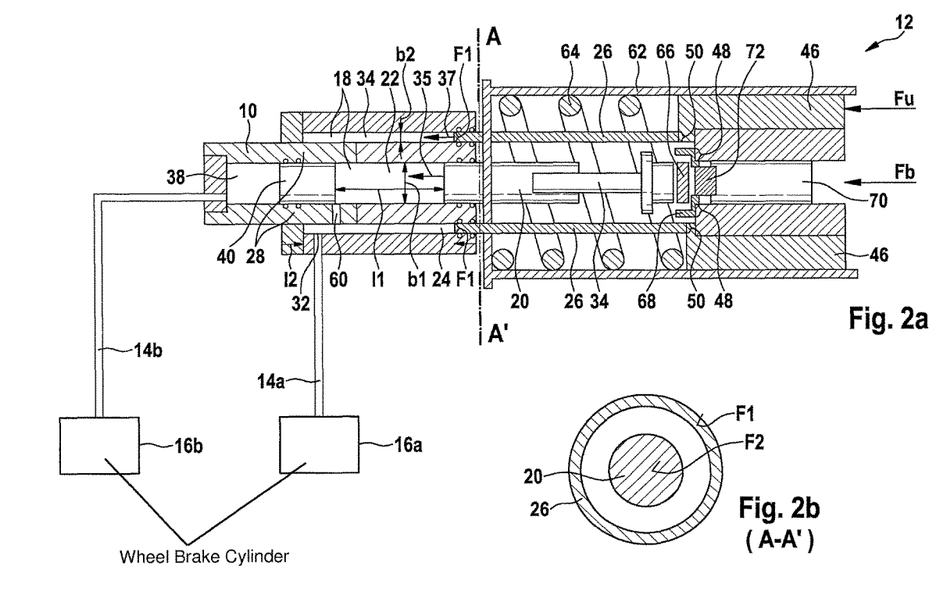
FIGS. 2a and 2b show a schematic illustration and a cross section, respectively, of a second specific embodiment of the master brake cylinder.

FIGS. 2a and 2b show a schematic illustration and a cross section, respectively, of a second specific embodiment of the master brake cylinder.

In the master brake cylinder schematically depicted in FIG. 2a, second pressure chamber 24 is delimited from first partial pressure chamber 22 via a partition 28 having at least one continuous flowthrough opening 60 (as a partial partition). Via a liquid exchange through flowthrough opening 60, it is thus ensurable that the same internal pressure is present in first pressure chamber 18, which includes at least first partial pressure chamber 22 and second partial pressure chamber 24. Thus, it is sufficient to hydraulically connect only one of the two partial pressure chambers 22 and 24, for example second partial pressure chamber 24, to brake circuit 14a associated with first pressure chamber 18, via a borehole 32.

FIG. 2b shows a cross section of the two rod piston elements 20 and 26 along line AA'. As is apparent from FIG. 2b, second rod piston element 26 has a continuous recess into which at least a portion of first rod piston element 20 movably protrudes. Second rod piston element 26 in particular has a ring-shaped cross section. In addition, second partial pressure chamber 24 is rotationally symmetrical with respect to a center longitudinal axis of first partial pressure chamber 22 which extends along first displacement direction 35. Thus, a rotationally symmetrical counterpressure distribution is also ensured during braking in first pressure chamber 18 by both rod piston elements 20 and 26. This facilitates uniform braking in first pressure chamber 18 itself when a comparatively high pressure is present therein. However, the design of the two rod piston elements 20 and 26 and of master brake cylinder 10 is not limited to this exemplary embodiment.

For example, first partial pressure chamber 22 may have a first maximum length 11 that is smaller along first displacement direction 35 (when first rod piston element 20 is in the farthest pushed-out position) than a second maximum length 12 of second partial pressure chamber 24 along second displacement direction 37 (when second rod piston element 26 is in the farthest pushed-out position). Alternatively or additionally, first partial pressure chamber 22 may have a first width b1 perpendicular to first displacement direction 35 which is larger than a second width b2 of second partial pressure chamber 24 perpendicular to second displacement direction 37. However, it is pointed out that in the design of the two partial pressure chambers 22 and 24, a high degree of freedom is available with respect to their dimensions.

Brake booster 12 schematically depicted in FIG. 2a includes a housing 62 having a restoring spring 64 inserted therein which presses booster member 46 into its starting position. Booster member 46 is movable against the force of restoring spring 64 from a starting position toward master brake cylinder 10 with the aid of a braking assisting force Fu of an actuator device (not illustrated). First rod piston element 20 at least temporarily contacts a first connecting component which is designed as a reaction disk 66 and a reaction disk guide 68, and which at least temporarily contacts a first contact surface 48 of booster member 46 in such a way that braking assisting force Fu is at least partially transmittable to first rod piston element 20. In addition, second rod piston element 26 at least temporarily contacts a second contact surface 50 of booster member 46 in such a way that the braking assisting force is at least partially transmittable to second rod piston element 26.

First contact surface 48 may also be understood to mean multiple partial surfaces that are situated separately from one another. Similarly, second contact surface 50 may also be subdivided into multiple separate partial surfaces. (The term "contact surface" is used in the singular solely for improved clarity.) However, it is pointed out that first contact surface 48 and second contact surface 50 are preferably understood to mean different (total) surfaces. In other words, the two contact surfaces 48 and 50 preferably do not overlap. Contact surfaces 48 and 50 are preferably not understood to mean congruent surfaces.

In addition, brake booster 12 may include an input rod component 70 on which a brake actuating element (not illustrated) is situatable in such a way that a driver braking force Fb exerted on the brake actuating element is transmittable to input rod component 70. The situatable brake actuating element may be a brake pedal, for example. However, instead of a brake pedal, a brake actuating element having some other design may also be situated on input rod component 70.

Input rod component 70 may be at least temporarily in contact with first rod piston element 20 (via a contacting element 72) in such a way that driver braking force Fb is at least partially transmittable to first rod piston element 20. In contrast, even partial transmission of driver braking force Fb to second rod piston element 26 is prevented. Prevention of at least partial transmission of driver braking force Fb to second rod piston element 26 is preferably not understood to mean an active process. Instead, input rod component 70 may at least temporarily contact first rod piston element 20 in such a way that no driver braking force Fb is transmitted to second rod piston element 26.

Brake booster 12 thus implements brake boosting which acts on the two independently movable rod piston elements 20 and 26. In brake booster 12, first rod piston element 20 is movable by driver braking force Fb (assisted by actuator device 12). In contrast, second rod piston element 26 is movable without effort by the driver with the aid of the (hydraulic or electromechanical) actuator device.

In particular when the actuator device is in a deactivated/functionally impaired state, first rod piston element 20 is still movable into master brake cylinder with the aid of driver braking force Fb. In this case, the advantageous split design of the rod piston is associated with the advantage that in the event of a functional impairment of actuator device/brake booster 12, only first rod piston element 20 is movable by actuating the brake actuating element, while second rod piston element 26 remains in a certain position despite the actuation of the brake actuating element by the driver. Thus, the driver does not have to brake using the total braking surface, which is equal to the sum of delimiting surfaces F1+F2, but, rather, only has to brake in first pressure chamber 18 of master brake cylinder 10, using a reduced braking surface which is equal to first delimiting surface F1. With the aid of a changed hydraulic transmission, this results in a greater braking effect despite a constant driver braking force Fb. In other words, due to the reduced braking surface, which is equal to first delimiting surface F1, driver braking force Fb causes a greater pressure build-up in master brake cylinder 10. Due to the advantageous design of master brake cylinder 10, the functional impairment of actuator device/brake booster 12 may thus be easily compensated for, at least partially, via an increased braking force to brake pressure ratio.

In addition, due to the advantageous subdivision into the at least two partial pressure chambers 22 and 24 which are delimited from one another, the braking volume of first pressure chamber 18 may be reduced in the event of a functional impairment of brake booster 12. This additionally improves the capability for compensating for a functional impairment/a failure of brake booster 12.

Figure 3A:
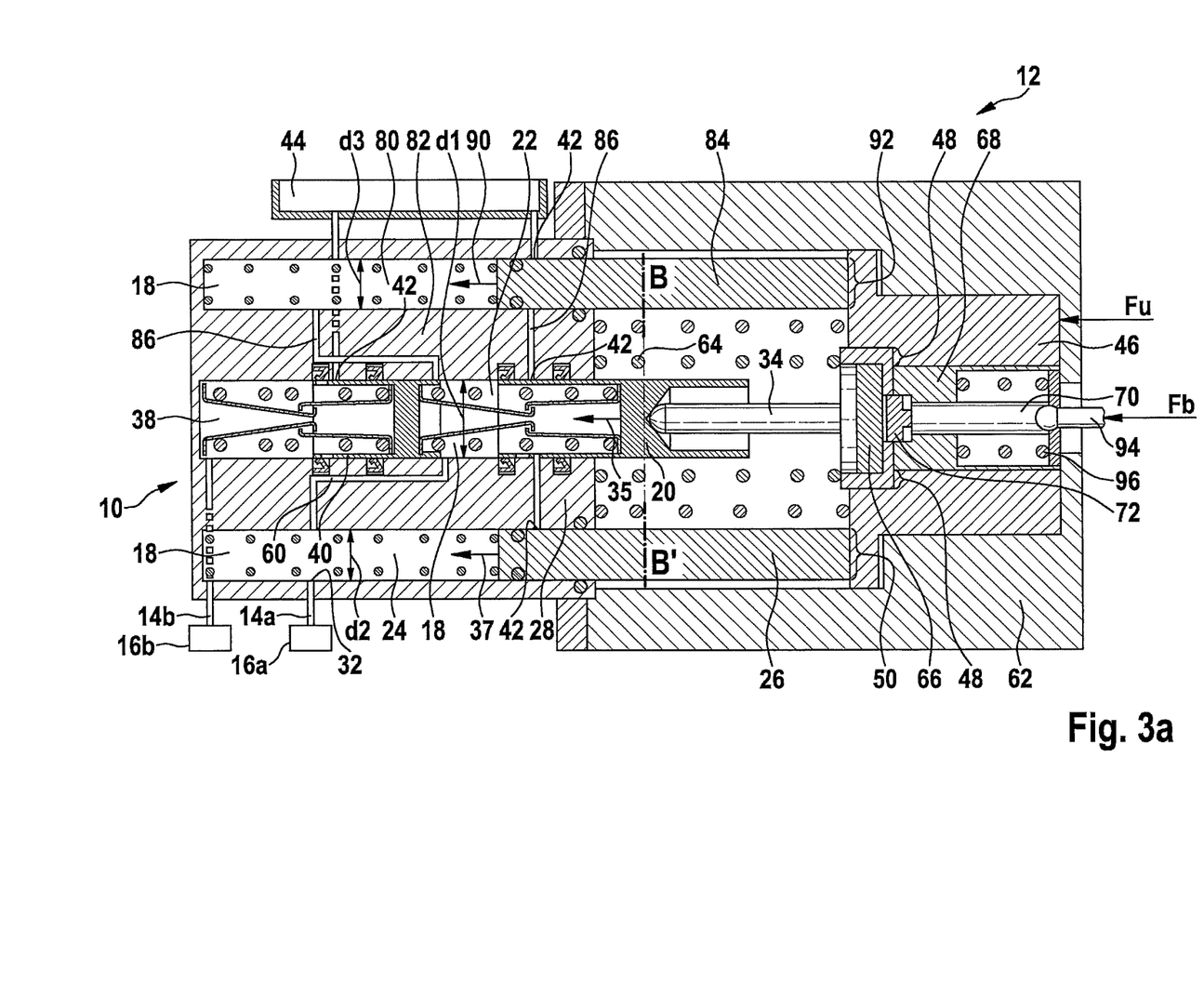
FIGS. 3a and 3b show a schematic illustration and a cross section, respectively, of a third specific embodiment of the master brake cylinder.
Figure 3B:
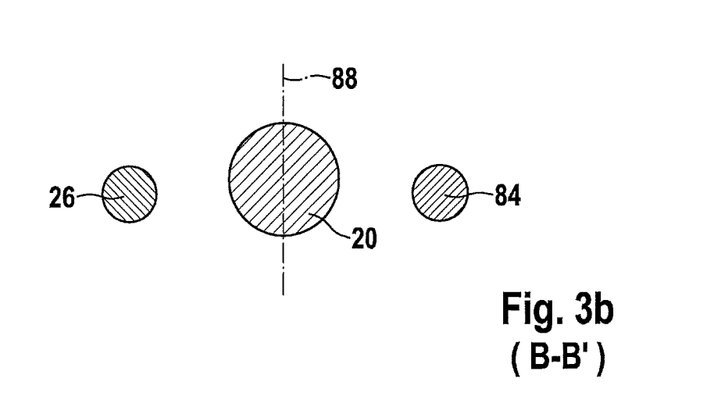

FIGS. 3a and 3b show a schematic illustration and a cross section, respectively, of a third specific embodiment of the master brake cylinder.

As a supplement to the above-described first specific embodiment, master brake cylinder 10 includes a third partial pressure chamber 80 of first pressure chamber 18, which is separated from first partial pressure chamber 22 at least via an additional partition 82. With regard to understanding the delimitation of third partial pressure chamber 80 from first partial pressure chamber 22, reference is made to the above discussion. As an alternative to delimiting third partial pressure chamber 80 from first partial pressure chamber 22, third partial pressure chamber 80 may be delimited from second partial pressure chamber 24 with the aid of at least additional partial partition 82.

Third partial pressure chamber 80 is designed in such a way that a third rod piston element 84 may be moved in so that a third partial residual volume of third partial pressure chamber 80 which is Tillable with liquid is reducible by moving (in) third rod piston element 84. In addition, at least one hydraulic connection 86 may be established between first partial pressure chamber 22 and third partial pressure chamber 80 and/or between second partial pressure chamber 24 and third partial pressure chamber 80 in such a way that the same internal pressure is settable in the at least three partial pressure chambers 22, 24, and 80 of first pressure chamber 18. The at least one hydraulic connection 86 may include, for example, a flowthrough opening in additional partition 82 and/or an externally guided line.

The pressure that is present in the at least three partial pressure chambers 22, 24, 80 of first pressure chamber 18 may thus also be varied/set by moving third rod piston element 84 in third partial pressure chamber 80. Master brake cylinder 10 schematically depicted in FIG. 3a is thus usable for two- or multi-stage brake boosting.

In one preferred design which is depicted as a cross section along line BB' with reference to FIG. 3b, third rod piston element 84 has a design that is mirror-symmetrical with respect to second rod piston element 26 regarding a plane of symmetry 88 which centrally intersects first rod piston element 20. Likewise, third partial pressure chamber 80 may have a design that is mirror-symmetrical with respect to second partial pressure chamber 24 regarding a plane of symmetry (not illustrated) which centrally intersects first partial pressure chamber 22. This ensures an advantageous spatial pressure/force distribution when the three rod piston elements 20, 26, and 84 are simultaneously moved into their associated partial pressure chambers 22, 24, and 80, respectively. In addition, the outer contours of the three rod piston elements 20, 26, and 84 and the three partial pressure chambers 22, 24, and 80, respectively, may be cylindrical. In particular, a diameter d1 of first partial pressure chamber 22 perpendicular to first displacement direction 35 of first rod piston element 20 may be twice second diameter d2 of second partial pressure chamber 24 perpendicular to second displacement direction 37 of second rod piston element 26, and/or twice diameter d3 of third partial pressure chamber 80 perpendicular to a third displacement direction 90 of third rod piston element 84. However, a high degree of freedom of design is ensured with regard to the dimensions of the three partial pressure chambers 22, 24, and 80.

Furthermore, third rod piston element 84 may at least temporarily contact a third contact surface 92 of booster member 46, or a third connecting component (not illustrated) which contacts third contact surface 92 of booster member 46, in such a way that braking assisting force Fu is at least partially transmittable to third rod piston element 84. In contrast, a transmission of relayed driver braking force Fb to third rod piston element 84 (via brake actuating element 94) may be prevented. Third rod piston element 84 may thus be used to assist the brake boosting which is implemented with the aid of second rod piston element 26.

Also in this specific embodiment of the master brake cylinder, stepped brake boosting is possible due to separating first pressure chamber 18 into the three partial pressure chambers 22, 24, and 80. A portion of the brake boosting is directly introduced into the hydraulic system, while another portion is usable for assisting in actuating brake actuating element 94 by the driver or for counteracting recoils (by spring 96, for example). In the event of a failure of the brake booster, a hydraulic transmission becomes active in master brake cylinder 10 described here which allows greater deceleration at identical actuating forces. Thus, master brake cylinder 10 may also be utilized as a volume booster.

Above-described master brake cylinders 10 may be easily accommodated as an additional component in a hydraulic braking system. It is pointed out that the usability of master brake cylinder 10 is not limited to a specific type of vehicle, such as a hybrid vehicle or an electric vehicle.

By suitable definition of the functions, each of master brake cylinders 10 may be designed in such a way that, in the event of a failure of the brake booster itself, a deceleration of 2.44 m/s$^2$ is still achievable with the aid of a driver braking force of only 500 N. In addition, master brake cylinder 10 may be designed without concern for the deceleration still to be achieved in the event of a functional impairment of brake booster 12. Even greater decelerations may still be achieved with the aid of each of master brake cylinders 10 in the event of a failure of brake booster 12.

Another advantage of the above-described specific embodiments of master brake cylinder 10 is that, at least in some braking systems, a vehicle deceleration of up to 6.44 m/s$^2$ is quickly achievable at a driver braking force Fb of 500 N, even with the ignition key removed. The deceleration may also be achievable in particular in a "dormant" braking system.

The advantageous manufacturing methods are schematically depicted with reference to the above-described specific embodiments of the master brake cylinders. Therefore, a further description of the manufacturing methods is dispensed with here.

What is claimed is:

1. A master brake cylinder for a braking system of a vehicle, comprising:
    a first partial pressure chamber, and a second partial pressure chamber delimited from the first partial pressure chamber via at least one partition, the first partial pressure chamber and the second partial pressure chamber fillable with liquid;
    a first rod piston element movable into at least the first partial pressure chamber in such a way that a first partial residual volume of the first partial pressure chamber is reducible by moving the first rod piston element; and
    a second rod piston element movable into the second partial pressure chamber in such a way that a second partial residual volume of the second partial pressure chamber is reducible by moving the second rod piston element;
    wherein the second rod piston element includes a continuous recess into which at least a portion of the first rod piston element movably protrudes.

2. The master brake cylinder as recited in claim 1, wherein:
    the at least one partition includes at least one continuous flowthrough opening in such a way that the first partial pressure chamber and of the second partial pressure chamber have the same internal pressure.

3. The master brake cylinder as recited in claim 1, further comprising:
an additional pressure chamber Tillable with liquid;
a floating piston element protruding into the additional pressure chamber in such a way that a residual volume of the second pressure chamber is variable by moving the floating piston element.

4. The master brake cylinder as recited in claim 1, wherein the second partial pressure chamber is rotationally symmetrical with respect to a center longitudinal axis of the first partial pressure chamber.

5. A braking unit for a braking system of a vehicle, comprising:
a brake booster; and
a master brake cylinder, including:
a first partial pressure chamber, and a second partial pressure chamber delimited from the first partial pressure chamber via at least one partition, the first partial pressure chamber and the second partial pressure chamber fillable with liquid,
a first rod piston element movable into at least the first partial pressure chamber in such a way that a first partial residual volume of the first partial pressure chamber is reducible by moving the first rod piston element, and
a second rod piston element movable into the second partial pressure chamber in such a way that a second partial residual volume of the second partial pressure chamber is reducible by moving the second rod piston element,
wherein the second rod piston element includes a continuous recess into which at least a portion of the first rod piston element movably protrudes.

6. The braking unit as recited in claim 5, wherein:
the brake booster includes a booster member on which a braking assisting force is exertable with the aid of an actuator device in such a way that the booster member is movable with the aid of the braking assisting force,
a first connecting component contacts the first contact surface of the booster member, in such a way that the braking assisting force is at least partially transmittable to the first rod piston element, and
the second rod piston element at least temporarily contacts a second contact surface of the booster member, in such a way that the braking assisting force is at least partially transmittable to the second rod piston element.

7. The braking unit as recited in claim 5, wherein:
the brake booster includes an input rod component on which a brake actuating element may be situated in such a way that a driver braking force exerted on the brake actuating element is transmittable to the input rod component, and
the input rod component is at least temporarily in indirect contact with the first rod piston element in such a way that the driver braking force is at least partially transmittable to the first rod piston element, while an at least partial transmission of the driver braking force to the second rod piston element is prevented.

8. A braking system for a vehicle, comprising:
at least one brake circuit; and
a master brake cylinder and a brake booster,
wherein the master brake cylinder includes:
a first partial pressure chamber, and a second partial pressure chamber delimited from the first partial pressure chamber via at least one partition, the first partial pressure chamber and the second partial pressure chamber fillable with liquid,
a first rod piston element movable into at least the first partial pressure chamber in such a way that a first partial residual volume of the first partial pressure chamber is reducible by moving the first rod piston element, and
a second rod piston element movable into the second partial pressure chamber in such a way that a second partial residual volume of the second partial pressure chamber is reducible by moving the second rod piston element,
wherein the second rod piston element includes a continuous recess into which at least a portion of the first rod piston element movably protrudes.

9. A manufacturing method for a master brake cylinder, comprising:
forming at least one first partial pressure chamber of a first pressure chamber in such a way that during operation of the master brake cylinder, a first partial residual volume of the first partial pressure chamber which is fillable with liquid is reduced by moving a first rod piston element into the first partial pressure chamber; and
additionally forming a second partial pressure chamber of the first pressure chamber which is delimited from the first partial pressure chamber via at least one partition in such a way that during operation of the master brake cylinder, a second partial residual volume of the second partial pressure chamber which is fillable with liquid is reduced by moving a second rod piston element into the second partial pressure chamber;
wherein the second rod piston element includes a continuous recess into which at least a portion of the first rod piston element movably protrudes.

10. A manufacturing method for a braking unit, comprising:
producing a master brake cylinder by:
forming at least one first partial pressure chamber of a first pressure chamber in such a way that during operation of the master brake cylinder, a first partial residual volume of the first partial pressure chamber which is fillable with liquid is reduced by moving a first rod piston element into the first partial pressure chamber, and
additionally forming a second partial pressure chamber of the first pressure chamber which is delimited from the first partial pressure chamber via at least one partition in such a way that during operation of the master brake cylinder, a second partial residual volume of the second partial pressure chamber which is fillable with liquid is reduced by moving a second rod piston element into the second partial pressure chamber; and
situating the master brake cylinder on a brake booster;
wherein the second rod piston element includes a continuous recess into which at least a portion of the first rod piston element movably protrudes.

11. A manufacturing method for a braking system, comprising:
producing a master brake cylinder and situating the master brake cylinder on a brake booster; and
forming at least one brake circuit at the master brake cylinder, wherein the master brake cylinder is produced by:
forming at least one first partial pressure chamber of a first pressure chamber in such a way that during operation of the master brake cylinder, a first partial residual volume of the first partial pressure chamber which is fillable with liquid is reduced by moving a first rod piston element into the first partial pressure chamber, and additionally forming a second partial pressure chamber of the first pressure chamber which is delimited from the first partial pressure chamber via at least one partition in such a way that during operation of the master brake cylinder, a second partial residual volume of the second partial pressure chamber which is fillable with liquid is reduced by moving a second rod piston element into the second partial pressure chamber, wherein the second rod piston element includes a continuous recess into which at least a portion of the first rod piston element movably protrudes.

\* \* \* \* \*